(12) United States Patent
Ikeda et al.

(10) Patent No.: US 10,984,273 B2
(45) Date of Patent: Apr. 20, 2021

(54) ATTACHABLE MATTER DETECTION APPARATUS

(71) Applicant: DENSO TEN Limited, Kobe (JP)

(72) Inventors: Nobuhisa Ikeda, Kobe (JP); Nobunori Asayama, Kobe (JP); Takashi Kono, Kobe (JP); Yasushi Tani, Kobe (JP); Daisuke Yamamoto, Kobe (JP); Tomokazu Oki, Kobe (JP); Teruhiko Kamibayashi, Kobe (JP)

(73) Assignee: DENSO TEN Limited, Kobe (JP)

( * ) Notice: Subject to any disclaimer, the term of this patent is extended or adjusted under 35 U.S.C. 154(b) by 35 days.

(21) Appl. No.: 16/683,624

(22) Filed: Nov. 14, 2019

(65) Prior Publication Data
US 2020/0210740 A1 Jul. 2, 2020

(30) Foreign Application Priority Data

Dec. 28, 2018 (JP) .............................. JP2018-248578

(51) Int. Cl.
*G06K 9/00* (2006.01)
*G06K 9/03* (2006.01)
(Continued)

(52) U.S. Cl.
CPC ........... *G06K 9/036* (2013.01); *G06K 9/6202* (2013.01); *G06T 7/0002* (2013.01); *G06T 7/13* (2017.01);
(Continued)

(58) Field of Classification Search
CPC ........ G06K 9/036; G06K 9/6202; G06T 7/13; G06T 7/0002; G06T 2207/30168; G06T 2207/30252
(Continued)

(56) References Cited

U.S. PATENT DOCUMENTS

| 8,553,088 | B2* | 10/2013 | Stein | B60Q 1/20 348/148 |
| 9,058,643 | B2* | 6/2015 | Cord | G06T 7/0002 |
| 10,552,706 | B2* | 2/2020 | Ikeda | G06K 9/2054 |

FOREIGN PATENT DOCUMENTS

| JP | 2001-141838 A | 5/2001 |
| JP | 2018-049568 A | 3/2018 |
| JP | 2018-072312 A | 5/2018 |

OTHER PUBLICATIONS

Kurihata, Hiroyuki, et al. "Rainy weather recognition from in-vehicle camera images for driver assistance." IEEE Proceedings. Intelligent Vehicles Symposium, 2005 . . . IEEE, 2005. (Year: 2005).*

* cited by examiner

*Primary Examiner* — Jonathan S Lee
(74) *Attorney, Agent, or Firm* — Oliff PLC

(57) ABSTRACT

An attachable matter detection apparatus includes a controller configured to function as an extractor and a detector. The extractor extracts edge information of each pixel contained in a photographic image photographed by an imaging device. The detector detects a candidate area estimated to have a water droplet out of the photographic image based on a matching result between (i) each of the pixels converted into a predetermined data format based on the edge information extracted by the extractor and (ii) a template representing a water droplet and having the data format. The detector calculates a matching frequency with the template for a predetermined area along a contour of the candidate area, and excludes the candidate area when the candidate area satisfies a predetermined exclusion condition based on the matching frequency.

10 Claims, 14 Drawing Sheets

(51) Int. Cl.
   *G06T 7/13*     (2017.01)
   *G06T 7/00*     (2017.01)
   *G06K 9/62*     (2006.01)

(52) U.S. Cl.
   CPC ............... *G06T 2207/30168* (2013.01); *G06T 2207/30252* (2013.01)

(58) Field of Classification Search
   USPC ......................................................... 382/103
   See application file for complete search history.

⇩

A B C D E F

| a | A A A B B C C D D E E F F F |

| b | A A A B B C C D E F F F F F F F F F F |
      THREE TIMES          TEN TIMES

| AREA ID | AREA INFORMATION | MATCHING INFORMATION | | ... |
| --- | --- | --- | --- | --- |
| | | SIDE | FREQUENCY | |
| xx1 | (x1, y1), w1, h1··· | UPPER | 8 | ... |
| | | LOWER | 13 | |
| | | LEFT | 5 | |
| | | RIGHT | 6 | |
| xx2 | (x2, y2), w2, h2··· | UPPER | 12 | ... |
| | | LOWER | 2 | |
| | | LEFT | 1 | |
| | | RIGHT | 4 | |
| xx3 | (x3, y3), w3, h3··· | UPPER | 0 | ... |
| | | LOWER | 9 | |
| | | LEFT | 0 | |
| | | RIGHT | 2 | |
| xx4 | (x4, y4), w4, h4··· | UPPER | 4 | ... |
| | | LOWER | 8 | |
| | | LEFT | 6 | |
| | | RIGHT | 9 | |
| ⋮ | ⋮ | ⋮ | ⋮ | ⋮ |

■ ROAD SURFACE REFLECTION CORRESPONDING CONDITION

| CONDITION #1 | MATCHING FREQUENCY FOR ANY ONE OF FOUR SIDES > 10 |
| --- | --- |
| CONDITION #2 | (MATCHING FREQUENCY FOR TWO SIDES = 0) AND (TOTAL MATCHING FREQUENCY FOR REMAINING TWO SIDES > 10) |
| CONDITION #3 | TOTAL MATCHING FREQUENCY FOR FOUR SIDES ≥ 25 |

AREA TO WHICH EXCLUSION CONDITION IS APPLIED

US 10,984,273 B2

ATTACHABLE MATTER DETECTION APPARATUS

BACKGROUND OF THE INVENTION

Field of the Invention

The invention relates to an attachable matter detection apparatus and an attachable matter detection method.

Description of the Background Art

Conventionally, there has been known an in-vehicle camera mounted on a vehicle to photograph surroundings of the vehicle. An image photographed by the in-vehicle camera is monitored and displayed, for example, to assist driver's visibility and is used in sensing to detect a white line on the road or an approaching object to the vehicle.

Incidentally, an attachable matter such as rain drops, snowflakes, dust, or mud is attached to a lens of the in-vehicle camera and may hinder the visibility assistance, or the sensing described above. In this regard, a technique of removing an attachable matter, for example, by extracting a so-called edge from a photographic image of the in-vehicle camera, detecting an attachable matter on a lens based on the edge, and spraying fluid washing water or compressed air to the lens of the in-vehicle camera has been proposed.

SUMMARY OF THE INVENTION

According to one aspect of the invention, an attachable matter detection apparatus includes a controller configured to function as an extractor and a detector. The extractor extracts edge information of each pixel contained in a photographic image photographed by an imaging device. The detector detects a candidate area estimated to have a water droplet out of the photographic image based on a matching result between (i) each of the pixels converted into a predetermined data format based on the edge information extracted by the extractor and (ii) a template representing a water droplet and having the data format. The detector calculates a matching frequency with the template for a predetermined area along a contour of the candidate area, and excludes the candidate area when the candidate area satisfies a predetermined exclusion condition based on the matching frequency.

As a result, it is possible to prevent a road surface reflection from being erroneously detected as a water droplet and it is possible to improve detection accuracy.

Therefore, an object of the invention is to provide an attachable matter detection apparatus and an attachable matter detection method capable of preventing a road surface reflection from being erroneously detected as a water droplet and improving detection accuracy.

These and other objects, features, aspects and advantages of the invention will become more apparent from the following detailed description of the invention when taken in conjunction with the accompanying drawings.

BRIEF DESCRIPTION OF THE DRAWINGS

FIG. 79 is an illustrative diagram (No. 2) of the detection information;

DESCRIPTION OF THE EMBODIMENTS

Hereinafter, an attachable matter detection apparatus and an attachable matter detection method according to an embodiment of the present application will be described in detail with reference to accompanying drawings. The invention is not limited to the embodiment described below.

Furthermore, a case where a water droplet attached to a lens of an in-vehicle camera mounted on a host vehicle to photograph surroundings of the host vehicle is detected as an attachable matter will be described by way of example.

After describing an outline of the attachable matter detection method according to the embodiment with reference to FIG. 1, an attachable matter detection apparatus 10 using the attachable matter detection method according to the embodiment will be described with reference to FIG. 2 to FIG. 9.

First, the outline of the attachable matter detection method according to the embodiment will be described with reference to FIG. 1. FIG. 1 is a schematic illustrative diagram of the attachable matter detection method according to the embodiment.

The in-vehicle cameras such as a front camera 2-1, a rear camera 2-2, a right side camera 2-3 and a left side camera 2-4 are mounted on the host vehicle to photograph surroundings of the host vehicle. Hereinafter, such in-vehicle cameras will be collectively referred to as a "camera 2".

The camera 2 includes an image sensor such as a charge coupled device (CCD) or a complementary metal oxide semiconductor (CMOS) to photograph surroundings of the vehicle using such an image sensor. A wide-angle lens such as a fisheye lens is employed in a lens of the camera 2, and each camera 2 has an angle view of 180° or larger. By using them, it is possible to photograph the entire circumference of the vehicle.

The camera 2 outputs the photographed image to an attachable matter detection apparatus (not shown) mounted on the vehicle.

The attachable matter detection apparatus analyzes a camera image of a single frame acquired from the camera 2 and detects an area where existence of the attachable matter is estimated from the camera image, for example, using a method such as a template matching based on edge information (a gradient of the luminance, etc.) of each pixel.

For example, the attachable matter detection apparatus detects a candidate area Da as an area estimated to have a water droplet out of a photographic image I.

Figure 1:
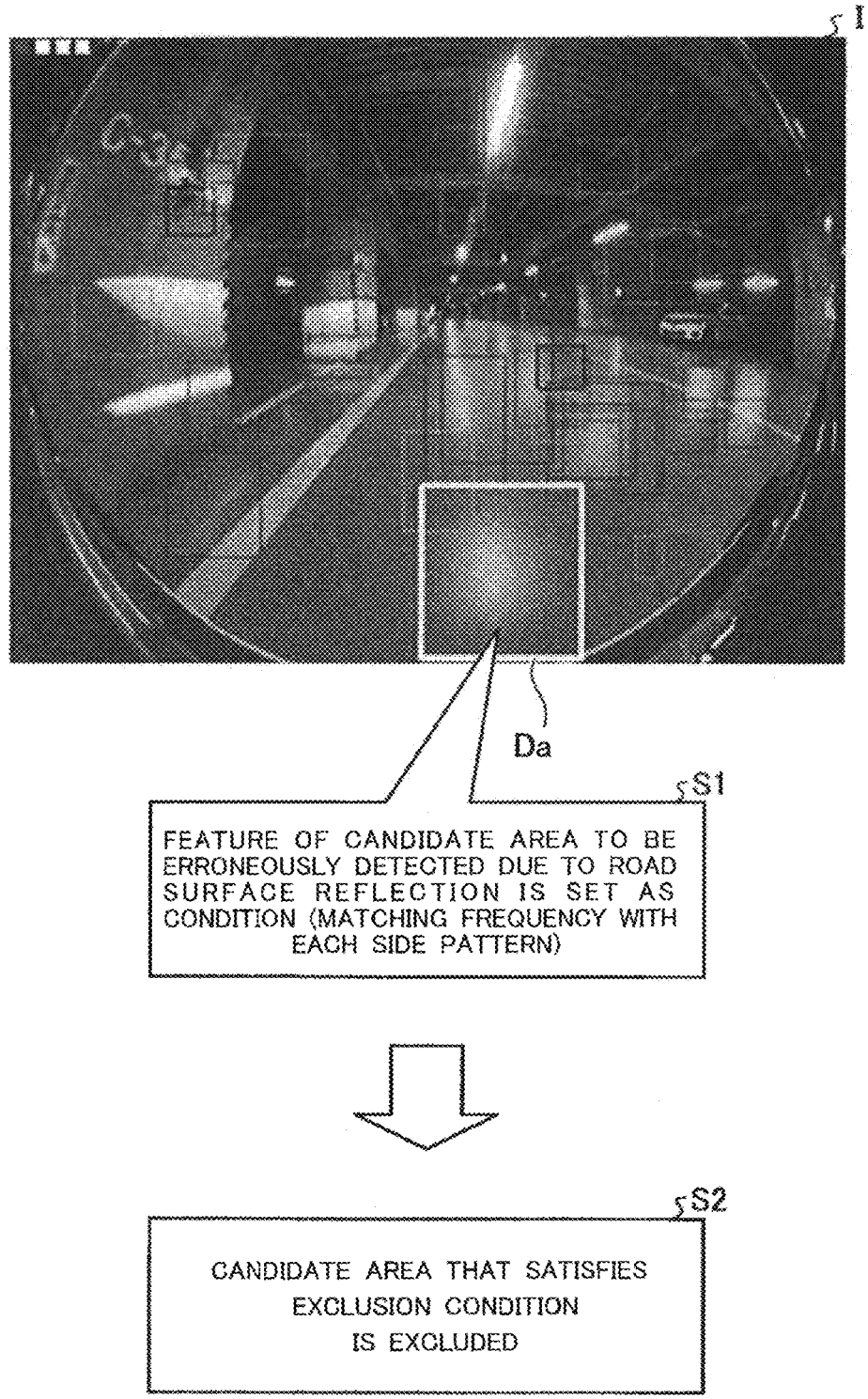
FIG. 1 is a schematic illustrative diagram of an attachable matter detection method according to an embodiment.

However, when detecting such a water droplet, for example, as illustrated in FIG. 1, there has been a case where an attachable matter detection apparatus according to a conventional technique erroneously detects a road surface reflection area due to a ceiling light, etc. as the candidate area Da where a water droplet exists. This is because the road surface reflection area appears blurred on the photographic image I as well as a water droplet attached to a lens.

Thus, in the attachable matter detection method according to the embodiment, a feature of the candidate area Da to be erroneously detected due to such a road surface reflection has been extracted from a plurality of sample data beforehand and set as a condition (a step S1). The condition relates to, for example, a matching frequency with each side pattern in the template matching described above, and the like.

Then, in the attachable matter detection method according to the embodiment, the condition is used as an exclusion condition, and the candidate area Da that satisfies the exclusion condition is excluded from areas estimated to have a water droplet (a step S2). Here, exclusion means that the candidate area Da that satisfies the exclusion condition is excluded from candidate areas. It does not mean that a partial area of the photographic image I corresponding to the candidate area Da that satisfies the exclusion condition is excluded from target areas of the attachable matter detection. As a result, it is possible to prevent a road surface reflection from being erroneously detected as after droplet. Therefore, according to the attachable matter detection method according to the embodiment, it is possible to improve attachable matter detection accuracy.

The feature that is observed when a road surface reflection is erroneously detected as a water droplet and details of the exclusion condition based on the feature will be described below with reference to FIG. 8A to FIG. 8F.

Hereinafter, the attachable matter detection apparatus 10 according to the embodiment using the aforementioned attachable matter detection method will be further described specifically.

Figure 2:
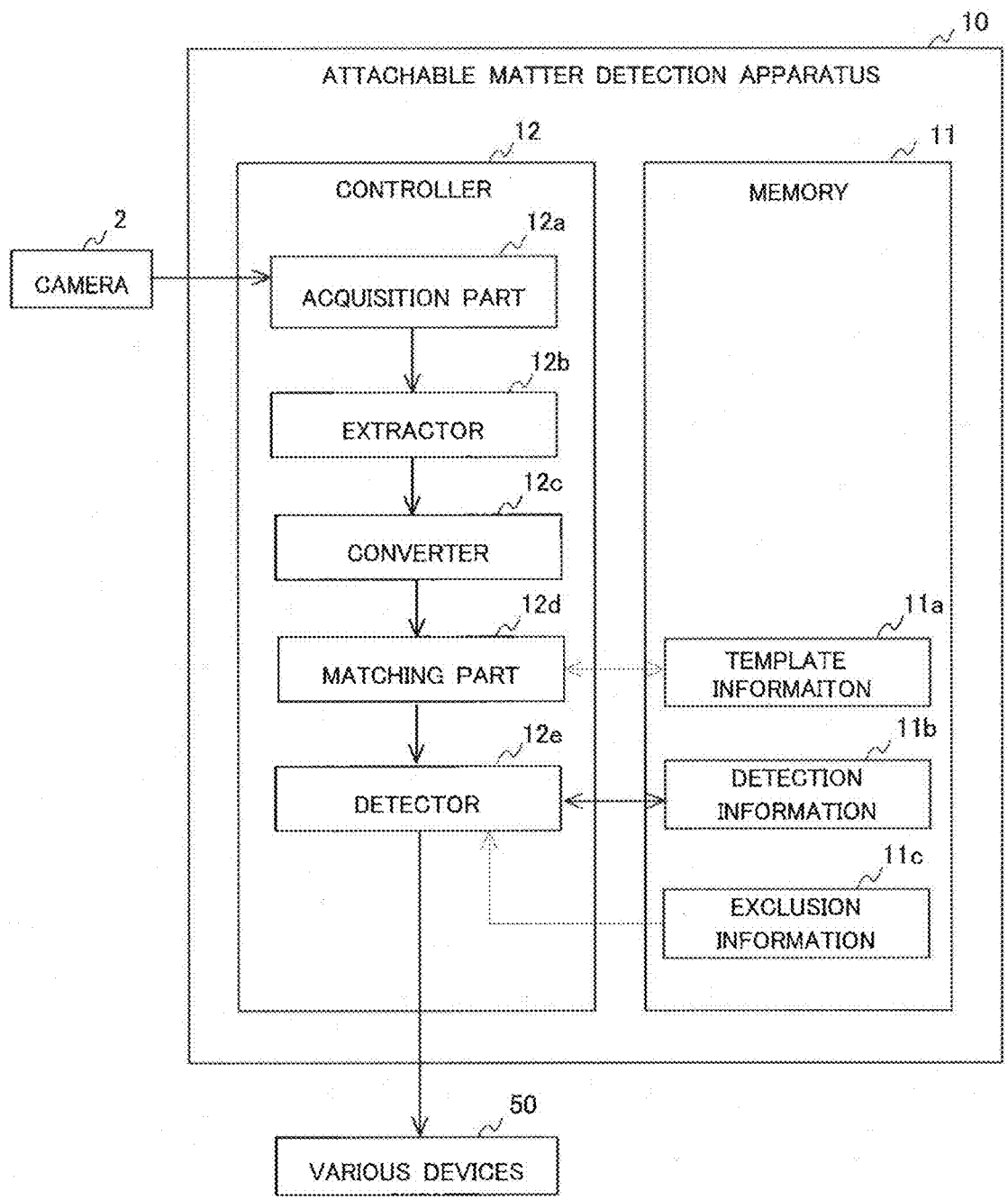
FIG. 2 is a block diagram of an attachable matter detection apparatus according to the embodiment.

FIG. 2 is a block diagram of the attachable matter detection apparatus 10 according to the embodiment. In FIG. 2, only elements necessary to describe the features of this embodiment are illustrated as functional blocks, and general elements are not illustrated for simplicity purposes.

In other words, each element illustrated in FIG. 2 is just functional and conceptual and is not necessarily configured as illustrated in a physical sense. For example, a distributed and/or integrated version of each functional block is not limited to those illustrated, and its entirety or a part thereof may be functionally or physically distributed or integrated in an arbitrary unit depending on various loads, use situations, and the like.

As illustrated in FIG. 2, the attachable matter detection apparatus 10 according to the embodiment includes a memory 11 and a controller 12. The attachable matter detection apparatus 10 is connected to the camera 2 and various devices 50.

FIG. 2 illustrates a case where the attachable matter detection apparatus 10 is configured separately from the camera 2 and the various devices 50. However, the invention is not limited thereto, and the attachable matter detection apparatus 10 may he configured integrally with at least one of the camera 2 and the various devices 50.

Since the camera 2 has been already described, the description thereof will be omitted. The various devices 50 acquire a detection result of the attachable matter detection apparatus 10 and perform various control of the vehicle. The various devices 50 include, for example, a display that notifies a user that an attachable matter is attached to the lens of the camera 2 and instructs the user to remove the attachable matter from the lens, a remover that removes the attachable matter by spraying a fluid, air, etc. to the lens, and a vehicle control device that controls autonomous driving, and the like.

The memory 11 is implemented, for example, by a semiconductor memory element such as a random access memory (RAM) or a flash memory, or a storage device such as a hard disk or an optical disk. FIG. 2 illustrates an example of the memory 11 that stores template information 11a, detection information 11b, and exclusion information 11c.

The template information 11a relates to a template that is used for a matching process executed by a matching part 12d described below. The detection information 11b includes data regarding a detection condition of the candidate area Da and the detected candidate area Da. The exclusion information 11c includes the exclusion condition described above.

The controller 12 uses the RAM as a work area to execute various programs stored in a storage device inside the attachable matter detection apparatus 10. The controller 12 includes, for example, a central processing unit (CPU) and a micro processing unit (MPU) that function by executing these programs. The controller 12 is implemented by an integrated circuit such as an application specific integrated circuit (ASIC) or a field programmable gate array (FPGA).

The controller 12 includes an acquisition part 12a, an extractor 12b, a converter 12c, the matching part 12d, and a detector 12e, and implements and executes information processing functions and operations described below.

The acquisition part 12a acquires a camera image of a single frame from the camera 2 and performs a preprocessing step for image analysis.

As one preprocessing step, for example, the acquisition part 12a converts the camera image into a grayscale image by performing grayscale conversion. The grayscale conversion refers to a conversion process of expressing each pixel of the camera image in grayscales from white to black depending on the luminance. The grayscale conversion may be omitted.

As another preprocessing step, for example, the acquisition part 12a changes a size of the camera image to a predetermined size. Furthermore, the acquisition part 12a outputs the preprocessed camera image to the extractor 12b.

The extractor 12b extracts edge information of each pixel in the camera image by applying a Sobel filter to the camera image that is input from the acquisition part 12a. Here, the edge information refers to edge strength in the X-axis and Y-axis directions of each pixel.

The extractor 12b outputs the extracted edge information to the converter 12c in associating with the grayscale image.

The extractor 12b may use another edge extraction method such as a Laplacian filter in place of the Sobel filter.

The converter 12c calculates a vector of an edge of each pixel based on the edge strength in the X-axis and Y-axis directions of each pixel input from the extractor 12b and encodes each edge direction. In the attachable matter detection apparatus 10 according to the embodiment, for example, a representative value of the edges of a plurality of the pixels is obtained, and this representative value is encoded. This will be described below in more details with reference to FIG. 4A and FIG. 4B.

The converter 12c outputs the grayscale image in which each edge direction is encoded to the matching part 12d. The matching part 12d performs a matching process between the encoded gray scale image input from the converter 12c and a code pattern representing features of a water droplet using a normalized expression. Here, the normalized expression refers to a single code expressing a set of code strings.

The code pattern representing features of a water droplet is stored in the template information 11a. This code pattern will be described below in more details with reference to FIG. 5A. The matching process by the matching part 12d will be described below in more details with reference to FIG. 5B.

The detector 12e detects the candidate area Da estimated to have a water droplet out of the photographic image I using a predetermined detection algorithm based on the edge information extracted by the extractor 12b.

Specifically, the detector 12e detects the candidate area Da where existence of the water droplet is estimated based on the code pattern extracted by the matching part 12d. The detector 12e determines whether or not each of the detected candidate areas Da is an area that truly has a water droplet.

The detector 12e notifies various devices 50 of the candidate area Da determined as having a water droplet as a result of the determination. On the other hand, the detector 12e does not notify various devices 50 of a candidate area Da determined as having no water droplet (i.e., erroneous detection) as a result of the determination, and excludes the candidate area Da from the processing target of the rear stage.

That is, the detector 12e excludes the candidate area Da with low reliability. As described above, by excluding an unnecessary image area, it is possible to improve the attachable matter detection accuracy and reduce a processing load of the rear stage. The detection process by the detector 12e will be described below in more details with reference to FIG. 6 to FIG. 8F.

Figure 3:
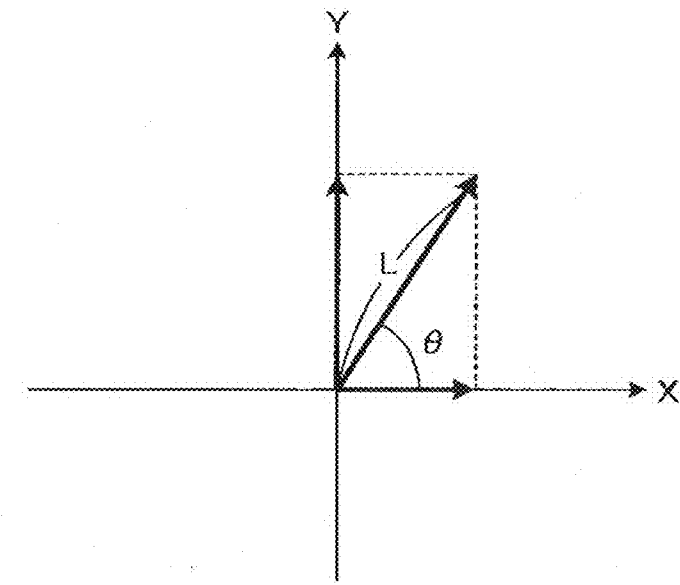
FIG. 3 illustrates a calculation method of a vector.
Figure 4A:
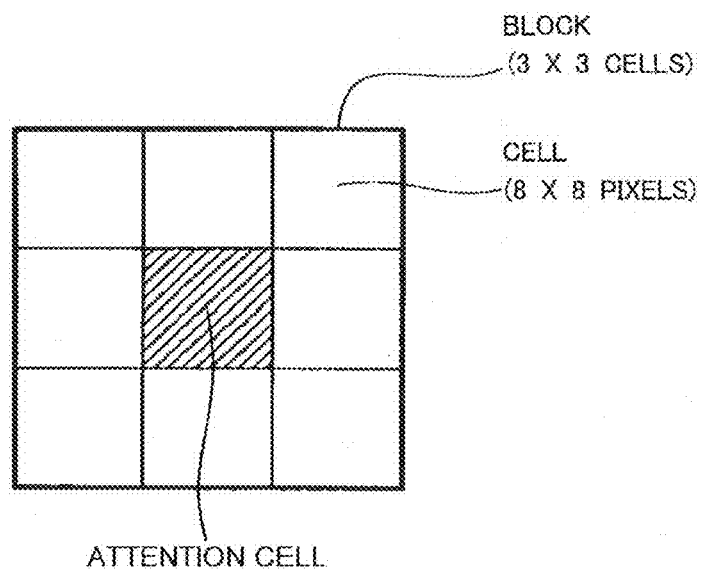
FIG. 4A is an illustrative diagram (No.1) of a calculation method of a representative value.
Figure 4B:
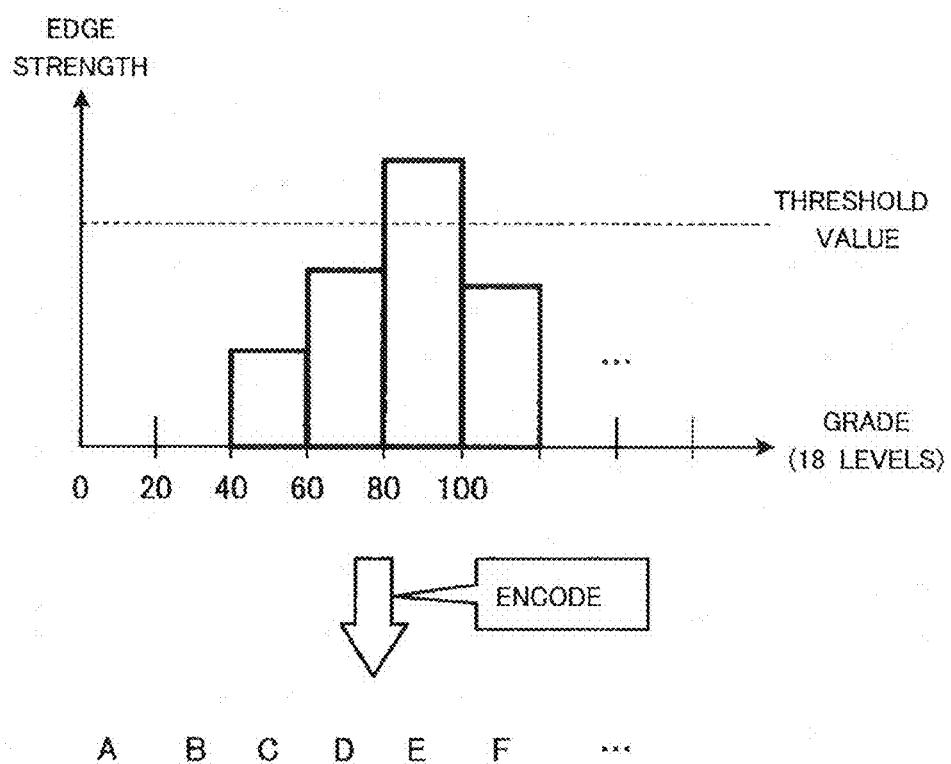
FIG. 4B is an illustrative diagram (No. 2) of the calculation method of the representative value.

Here, each exemplary algorithm executed by the converter 12c, the matching part 12d, and the detector 12e will be specifically described with reference to FIG. 3 to FIG. 8F. FIG. 3 illustrates a calculation method of a vector. FIG. 4A and FIG. 4B are illustrative diagrams (No. 1) and (No. 2) of calculation methods of representative values.

Figure 5A:
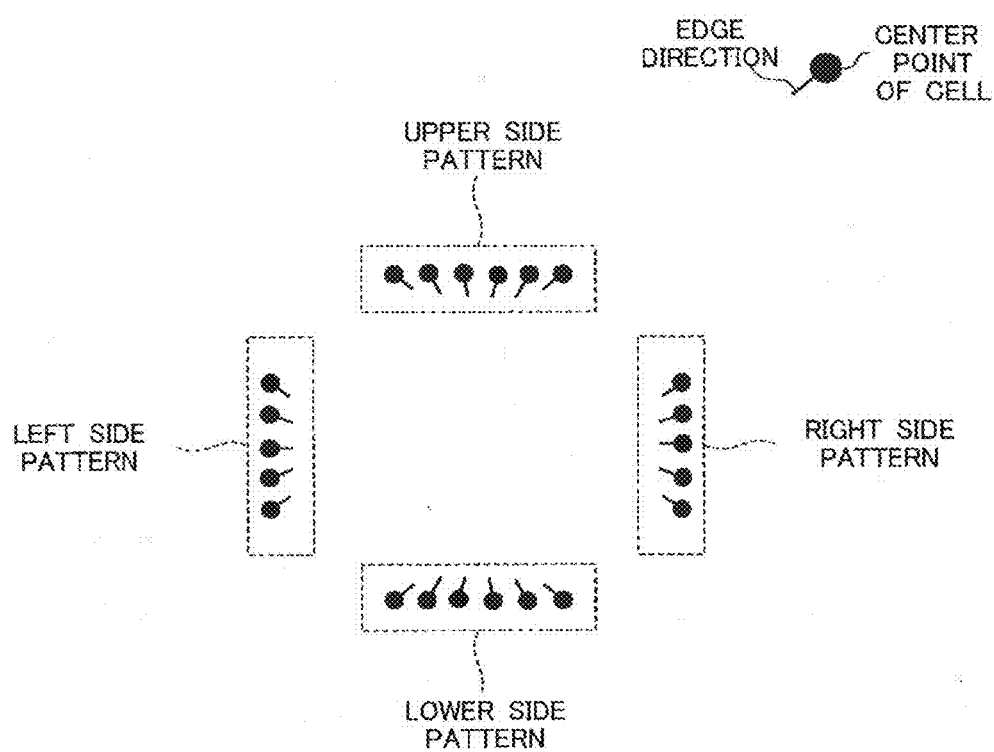
FIG. 5A illustrates an exemplary template.
Figure 5B:
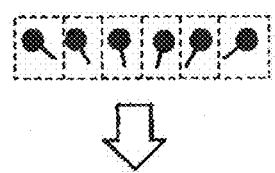
FIG. 5B illustrates an exemplary matching process.
Figure 6:
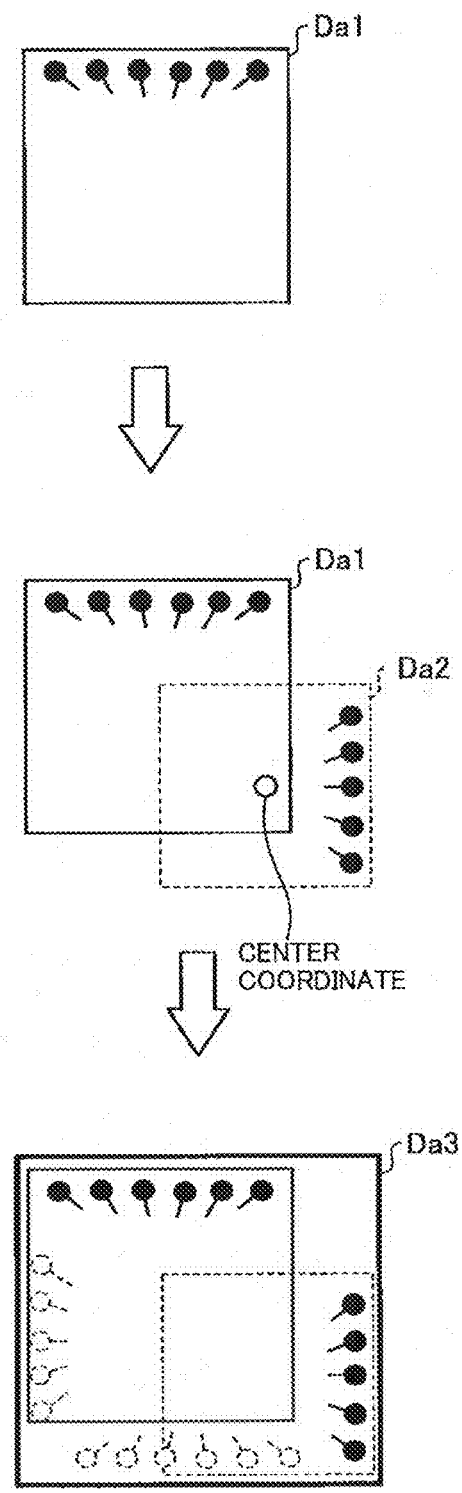
FIG. 6 illustrates an exemplary detection process.

FIG. 5A illustrates an exemplary template. FIG. 5B illustrates an exemplary matching process. FIG. 6 illustrates an exemplary detection process.

FIG. 7A to FIG. 7D are illustrative diagrams (No. 1) to (No. 4) of the detection information 11b. FIG. 8A to FIG. 8F are illustrative diagrams (No. 1) to (No. 6) of exclusion processes of the candidate areas Da executed by the detector 12e.

First, specifically as illustrated in FIG. 3, the converter 12c calculates the vector of each pixel using a trigonometric function based on the edge strength in the X-axis direction and the Y-axis direction. Hereinafter, an angle θ between the vector calculated from FIG. 3 and the X-axis on the positive direction side will be referred to as an "edge direction", the length L of the vector V will be referred to as "edge strength" of each pixel.

The converter 12c may not necessarily calculate the edge direction for overall pixels. Instead, the calculation process may be simplified by calculating the edge direction for each pixel at a predetermined interval in a low priority area.

The converter 12c encodes the calculated edge direction. For example, the converter 12c obtains a representative value of the edges of a plurality of the pixels and encodes the representative value. Specifically, as illustrated in FIG. 4A, for example, 8×8 pixels will be referred to as a "cell", and 3×3 cells will be referred to as a "block". The center cell of the block will be referred to as an "attention cell".

The converter 12c creates a histogram representing the edge direction and the edge strength of each pixel for each block. Such a histogram will be described with reference to FIG. 4B. Here, the converter 12c derives the edge direction of the center coordinates of the attention cell from the histogram of the block.

If the representative value of the attention cell of a single block is derived, the converter 12c shifts the block by a single cell and creates a histogram. Then, a representative value of the attention cell of this block is calculated.

That is, it is possible to reduce the data amount by calculating representative values for each of a plurality of pixels. Since 8×8 cells are employed in the example of FIG. 4A, the data amount is reduced to 1/64.

The numbers of pixels in the block and the cell of FIG. 4A are just exemplary and may be set arbitrarily. In this case, the number of pixels in each cell may be changed depending on the size of the water droplet to be detected.

For example, when it is desired to detect a small water droplet, the number of pixels in the cell is set to be small. When it is desired to detect a large water droplet, the number of pixels in the cell is set to be large. As a result, it is possible to effectively detect a water droplet having a desired size.

The converter 12c may simply create the histogram for each cell and calculate the representative value of each cell based on this histogram. The converter 12c may encode overall pixels without calculating the representative value.

Next, the histogram will be described with reference to FIG. 4B. In FIG. 4B, the ordinate refers to the edge strength, and the abscissa refers to the grade of the edge direction. As illustrated in FIG. 4B, the converter 12c creates the histogram by allocating the edge direction to each grade of 18 levels set to an angle of 20°.

Specifically, the converter 12e creates the histogram of the block by adding the edge strength of each pixel of the block to the grade corresponding to the edge direction. Subsequently, the converter 12c obtains a grade in which a sum of the edge strength is maximized from the created histogram.

In an example of FIG. 4B, a case where the grade of "80° to 100°" has a maximum value is illustrated. In this case, the converter 12c sets a grade as the representative value if the sum of the edge strength is equal to or larger than a threshold value in the grade.

In the example of FIG. 4B, the sum of the edge strength exceeds the threshold value in the grade of "80° to 100°". Therefore, the aforementioned condition is satisfied. For this reason, the grade of the attention cell in this block is set to "80° to 100°".

Subsequently, the converter 12c converts the attention cell into a code allocated depending on the grade. Here, each of eighteen types of codes "0 to 9" and "A" to "H" is allocated to each grade. "0 to 9" and "A to H" are codes allocated to each grade obtained by dividing from "0°" to "360°" in the unit of 20°. When the representative value does not exceed the threshold value, that is, to a cell having low edge strength, a code"Z" is allocated.

In this manner, the converter 12c performs encoding for overall cells. As a result, in the encoded camera image, the codes are arranged in a grid shape. The converter 12c may calculate the representative value using a statistic calculation method other than the aforementioned calculation of the representative value.

In FIG. 4B, a case where the edge direction is classified into eighteen grades has been described. However, without limiting thereto, the number of grades may increase or decrease from eighteen grades. FIG. 4B illustrates a case where the codes include "A" to "H" and "Z". However, the codes may include other characters such as Hiragana or numerical values, symbols, and the like.

Subsequently, as described above, the matching part 12d performs the matching process between the encoded camera image and the template stored as the template information 11a. FIG. 5A illustrates an exemplary template. In FIG. 5A, in order to facilitate visual recognition, a template is schematically illustrated using actual edge directions represented by pin shaped symbols instead of the aforementioned codes.

As illustrated in FIG. 5A, the template information 11a, as the template, has a code pattern as a code string representing features of a water droplet. Specifically, the template includes, for example, an upper side pattern, a lower side pattern, a left side pattern, and a right side pattern.

Here, each side pattern illustrated in FIG. 5A indicates each side of a rectangular that internally or externally envelops a water droplet. Here, "internally envelops a water droplet" means that the water droplet is inscribed in the rectangular. Furthermore, "externally envelops a water droplet" means that the rectangular is inscribed in the water droplet. In this embodiment, the "rectangular" includes a quadrate. In FIG. 5A, a case where each edge direction of each side pattern is directed to the center is illustrated. In this case, the luminance of the water droplet increases from the end to the center. That is, the center is bright, and the end is dark as a feature of the water droplet.

Conversely, the template information 11a may include each side pattern representing a feature of a water droplet in which the luminance of the water droplet increases from the center to the end (i.e., the center is dark, and the end is bright). As a result, it is possible to detect various water droplets.

Although four patterns including upper, lower, left, and right side patterns are exemplified in FIG. 5A, a pattern having a slope direction may also be employed. As a result, it is possible to improve water droplet detection accuracy.

Subsequently, FIG. 5B illustrates an exemplary matching process using each side pattern. Here, for convenient description purposes, the upper side pattern of FIG. 5A is indicated by the codes A to F. In (a) and (b) of FIG. 5A, a part of the encoded camera image is schematically illustrated.

As illustrated in (a) of FIG. 5B, if the code patterns are aligned sequentially in order of A to F, the matching part 12d determines that this code pattern matches the upper side pattern.

Specifically, as illustrated in (a) of FIG. 5B, for example, if an array in which "A" is repeated three times, "B", "C", "D", and "E" are repeated twice, and "F" is repeated three times satisfies an arrangement sequence of each code of the upper side pattern, the matching part 12d extracts this array as the upper side pattern.

This is because the repetition frequency of the code is different depending on the size of the water droplet. That is, as the size of the water droplet increases, the length of each code string increases. In this manner, by allowing repetition of the codes, it is possible to extract a code string indicating a plurality of water droplets having different sizes through a single matching process.

Therefore, it is possible to detect a water droplet while reducing a processing load. A plurality of patterns of the code strings having different lengths depending on the size of the water droplet may be prepared for each side, and the matching part 12d may extract the code strings using all of the patterns.

Since the water droplet typically has a spherical shape, the repetition frequency of each code becomes linearly symmetric with respect to the center. For this reason, the matching part 12d excludes a code string having imbalance from the extracted code stings.

Specifically, as illustrated in (b) of FIG. 5B, the matching part 12d carefully investigates balance between "A" and "F" located in both ends. Here, in FIG. 5B, "A" is repeated three times, ad "F" is repeated ten times.

In this case, when the number of "A" and the number of "F" are different twice or more, the matching part 12d excludes this code string pattern even when it satisfies the arrangement sequence. As a result, it is possible to prevent erroneous extraction of an unnecessary code pattern other than a water droplet and suppress erroneous detection of a water droplet.

For example, when the extracted code string is longer than a threshold value, the matching part 12d may exclude this code string from the matching. This is because, if the code string is long, a possibility of the water droplet is low. For this reason, it is possible to suppress erroneous detection of a water droplet. It is assumed that this threshold value is derived as an optimum value through a statistic method or the like in advance.

Next, FIG. 6 illustrates an exemplary detection process of the candidate area Da performed by the detector 12e after the matching process. Similarly to FIG. 5A, FIG. 6 schematically illustrates actual edge directions instead of codes.

Here, a case where an upper side pattern is initially extracted by the matching part 12d will he described. First, the detector 12e sets a substantially rectangular candidate area Da1 based on a width of the upper side pattern.

Subsequently, it is assumed that the matching part 12d extracts the right side pattern in a position deviated from the candidate area Da1. In this case, if a central coordinate of the candidate area Da2 of the right side pattern is within the candidate area Da1, the detector 12e performs a process of integrating both the candidate areas Da1 and Da2.

Then, for example, when the lower side pattern or the left side pattern is extracted from the integrated candidate area D3, the detector 12e detects the integrated candidate area Da1 as an area estimated to have a water droplet. In other words, the detector 12e detects the candidate area Da estimated to have a water droplet by setting a detection condition in which a pattern indicating each side having different three or more directions is extracted (hereinafter, referred to as a directional condition).

Instead of this directional condition, the detector 12e may set a detection condition (hereinafter, referred to as a frequency condition), for example, in which a pattern indicating each side is extracted frequently by a predetermined number or more (for example, four times including upper, lower, left, and right sides) in the integrated candidate area Da3.

In this manner, by setting the directional condition including three or more directions or the frequency condition as the detection condition, the candidate area Da estimated to have a water droplet is detected even when all of upper, lower, left, and right sides are not extracted. That is, it is possible to detect, for example, a semicircular water droplet removed from the camera image. The detection condition is, for example, included in the detection information 11b and stored.

Although a case where the candidate areas Da are integrated when the central coordinate of the candidate area Da2 is settled in the candidate area Da1 of the upper side pattern has been described in FIG. 6, the invention is not limited thereto. That is, if at least parts of the candidate areas Da1 and Da2 are overlapped, both candidate areas may be integrated.

The integrated candidate area Da1 may be a logical product between the candidate areas Da1 and Da2 or may be a logical sum of the candidate areas. In addition, although the candidate areas Da1 and Da2 have a rectangular shape in FIG. 6, the candidate area may have any other shape such as a circular shape without limiting thereto.

Then, the detector 12e stores the data regarding the detected candidate area Da in the detection information 11b. Specifically, as illustrated in FIG. 7A, the detection information 11b includes, for example, an upper left coordinate (x, y), a width w, and a height h of the candidate area Da detected as a rectangular shape.

Figures 7A, 7B:
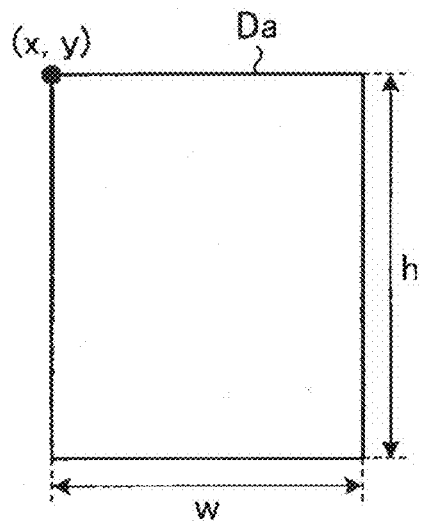
FIG. 7A is an illustrative diagram (No. 1) of detection information.

As illustrated in FIG. 7B, the detection information 11b includes, for example, an "area ID" column, an "area information" column, and a "matching information" column. The "matching information" column includes a "side" column, and a "frequency" column.

The "area ID" column stores identification information of the candidate area Da, and the detection information 11b is managed for each area ID described above.

The "area information" column stores the upper left coordinate (x, y), the width w, the height h, and the like of the detected candidate area Da illustrated in FIG. A. The "matching information" column stores the matching frequency between each side pattern and each side of the candidate area Da in the aforementioned matching process.

Figure 7C:
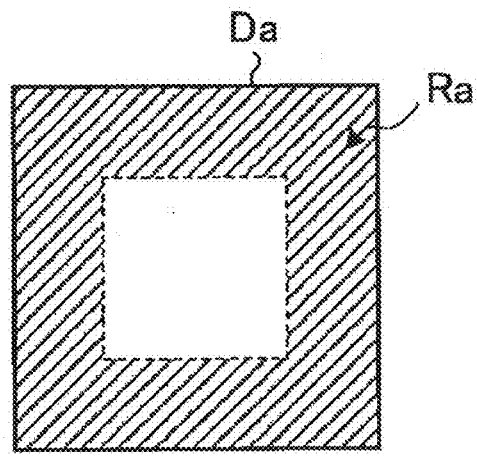
FIG. 7C an illustrative diagram (No. 3) of the detection information.

Specifically, as illustrated in FIG. 7C, the detector 12e calculates the matching frequency with each side pattern in a contour area Ra along a contour of the detected candidate area Da and stores the frequency in the "matching information" column.

Figure 7D:
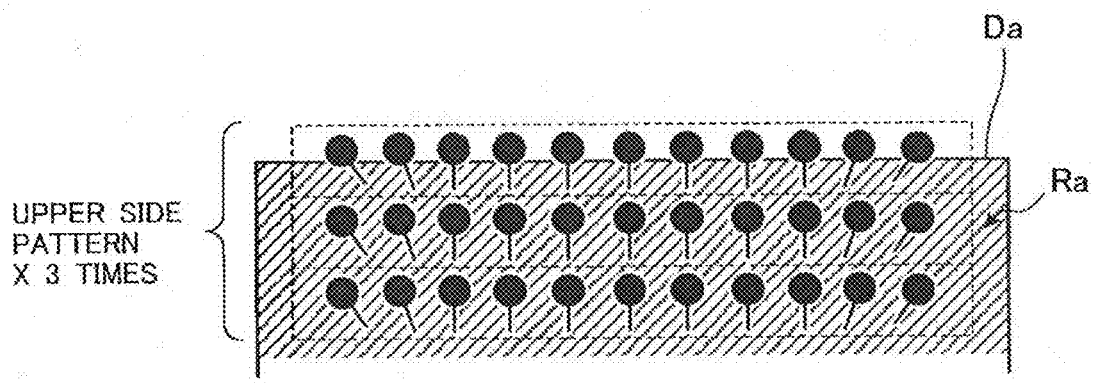
FIG. 7D is an illustrative diagram (No. 4) of the detection information.

For example, in an example of FIG. 7D, the candidate area Da matches an upper side pattern three times in a contour area Ra along the upper side of the candidate area Da. In this case, the detector 12e stores "upper" in the side column and "3" in the frequency column of the "matching information" column of the corresponding candidate area Da in the detection information 11b.

If the frequency is high, it is estimated that the candidate area Da has a wide blurred contour in which the luminance gradually changes.

Then, the detector 12e determines whether or not each of the detected candidate areas Da is an area that truly has a water droplet based on the detection information 11b and the exclusion information 11c.

Specifically, the exclusion information 11c includes a predetermined exclusion condition. More specifically, in the exclusion information 11c, a "road surface reflection corresponding condition" is set beforehand based on a "feature of the candidate area Da in correct detection" in which a water droplet is detected as a water droplet and a "feature of the candidate area Da in erroneous detection" in which a road surface reflection is detected as a water droplet.

The "feature of the candidate area Da in correct detection" and the "feature of the candidate area Da in erroneous detection" are extracted based on a plurality of sample data collected, for example, in experiments during development of the attachable matter detection apparatus 10.

Figure 8A:
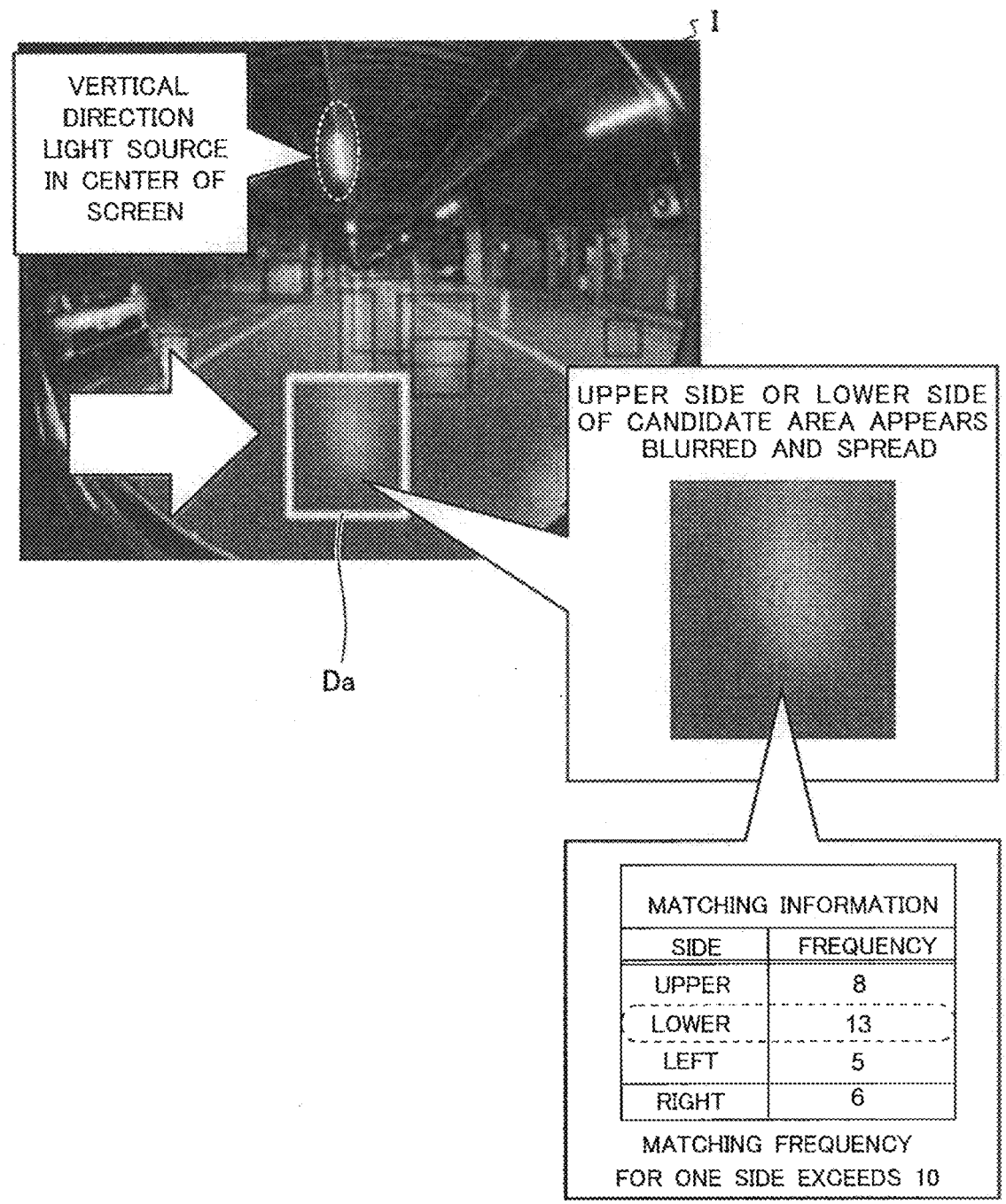
FIG. 8A is an illustrative diagram (No. 1) of an exclusion process of a candidate area executed by a detector.

Here, the "feature of the candidate area Da in erroneous detection" will be described with reference to FIG. 8A to FIG. 8D, giving some examples in an indoor parking space. First, as illustrated in FIG. 8A, in the photographic image I, when there is a vertical direction light source in a center of a screen, an upper side or a lower side of the erroneously detected candidate area Da may tend to appear blurred and spread. In this case, in the matching information (corresponding to the "matching information" column of the detection information 11b), a matching frequency for at least any one side exceeds 10 (refer to art area surrounded by a closed curve with a broken line).

Figure 8B:
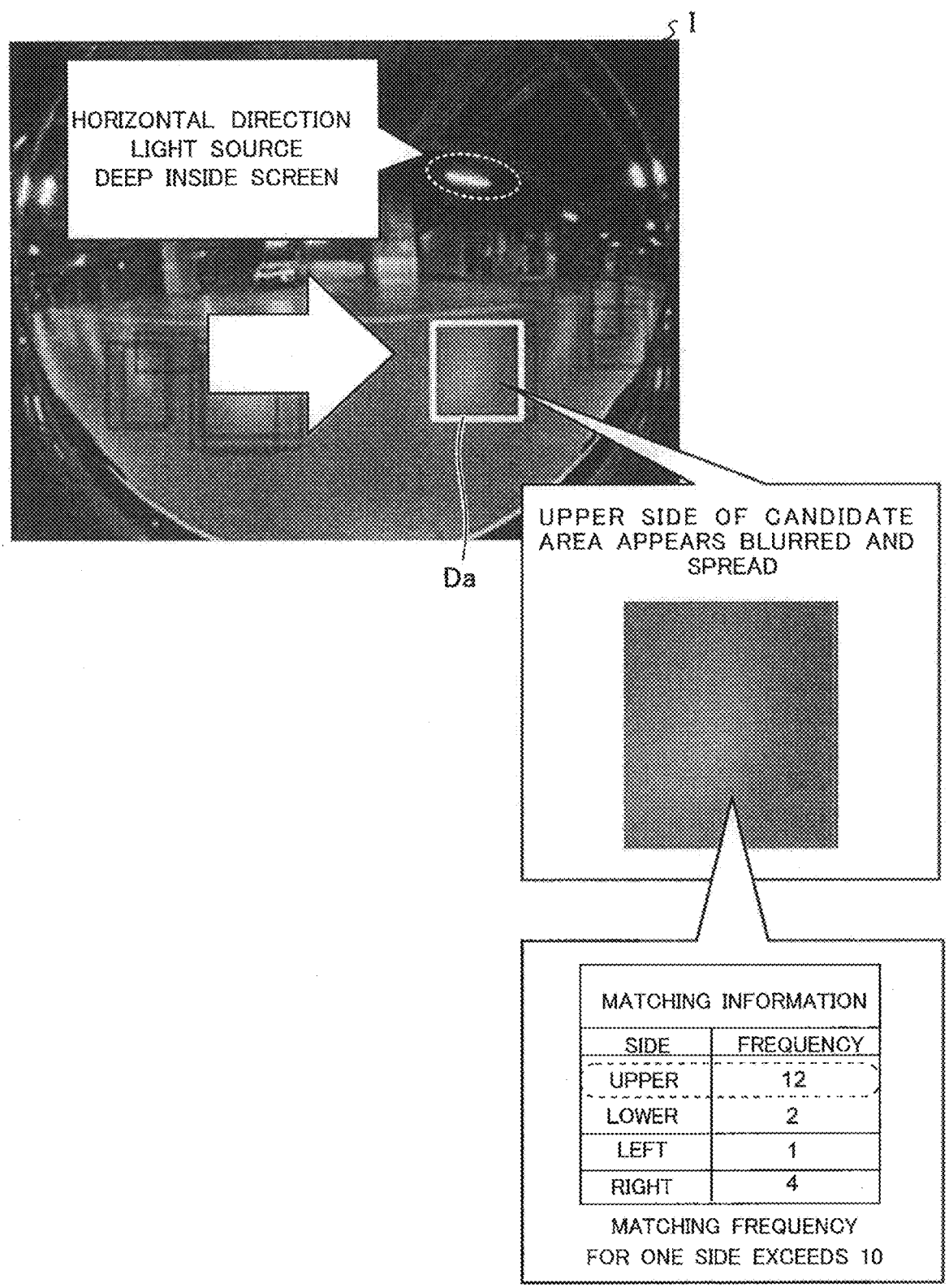
FIG. 8B is an illustrative diagram (No. 2) of the exclusion process of the candidate area executed by the detector.

As illustrated in FIG. 8B, in the photographic image I, when a horizontal direction light source exists deep inside a screen, an upper side of the erroneously detected candidate area Da may tend to appear blurred and spread. In this case, in the matching information, a matching frequency for at least any one side exceeds 10 (refer to an area surrounded by a closed curve with a broken line).

Figure 8C:
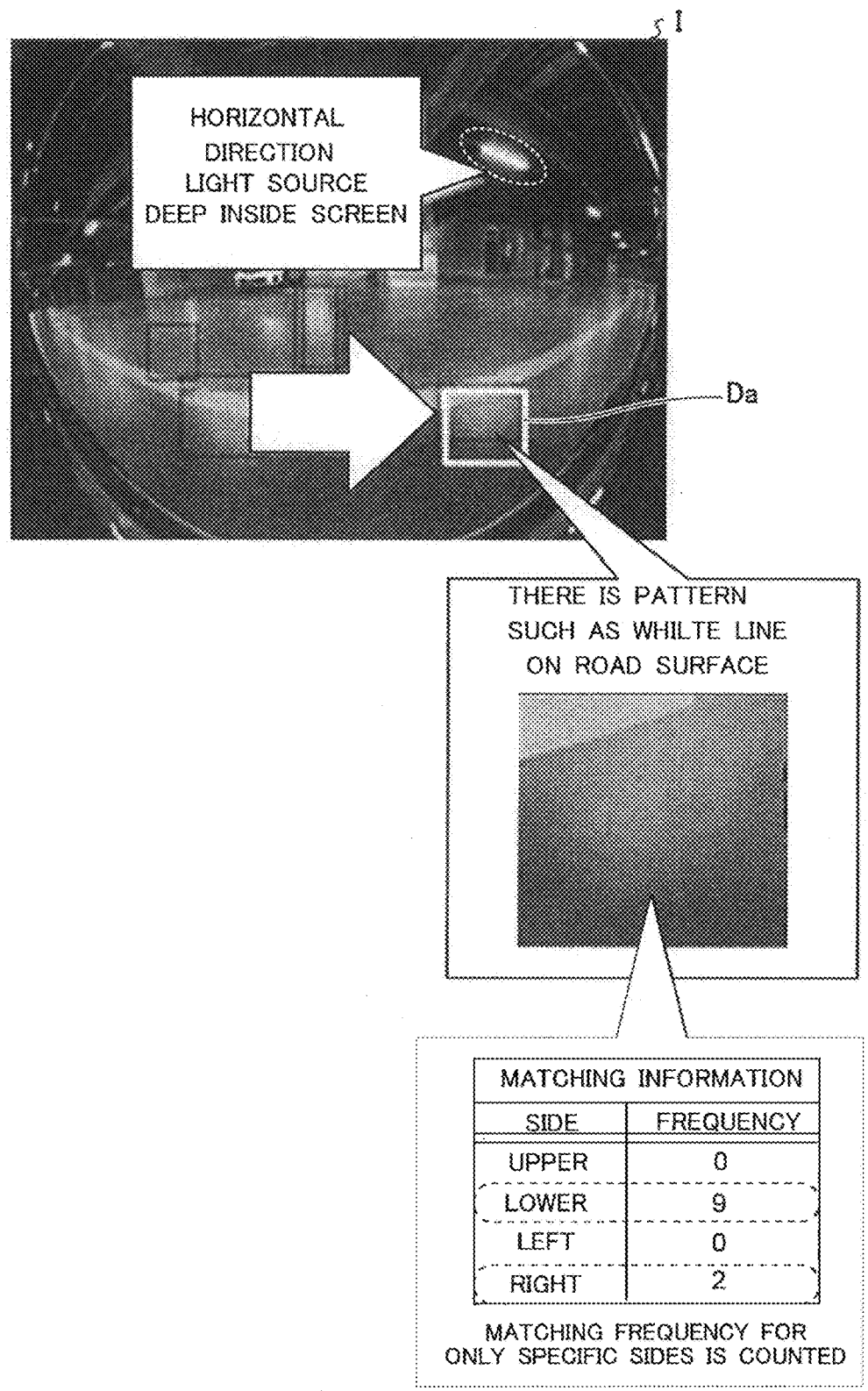
FIG. 8C is an illustrative diagram (No. 3) of the exclusion process of the candidate area executed by the detector.

As illustrated in FIG. 8C, in the photographic image I, when there is a pattern such as a white line on a road surface and the erroneously detected candidate area Da includes such a pattern, in the matching information, a matching frequency for only specific sides tends to be counted (refer to an area surrounded by a closed curve with a broken line).

Figure 8D:
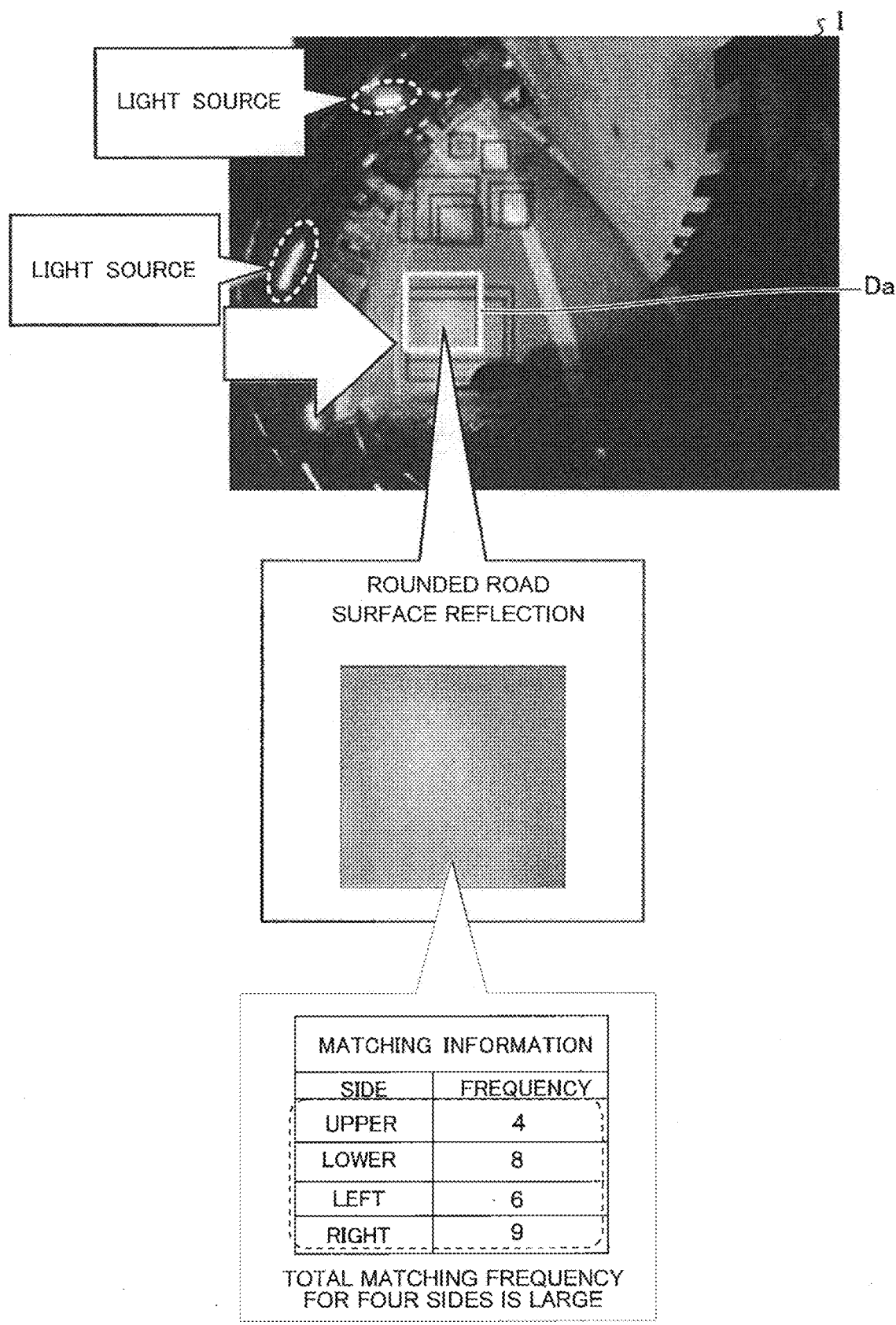
FIG. 8D is an illustrative diagram (No. 4) of the exclusion process of the candidate area executed by the detector.

As illustrated in FIG. 8D, in the photographic image, when there is a plurality of light sources, the erroneously detected candidate area Da may be a rounded road surface reflection. In this case, in the matching information, a total matching frequency for four sides tends to be larger than that in correct detection of a water droplet (refer to an area surrounded by a closed curve with a broken line).

Figures 8E, 8F:
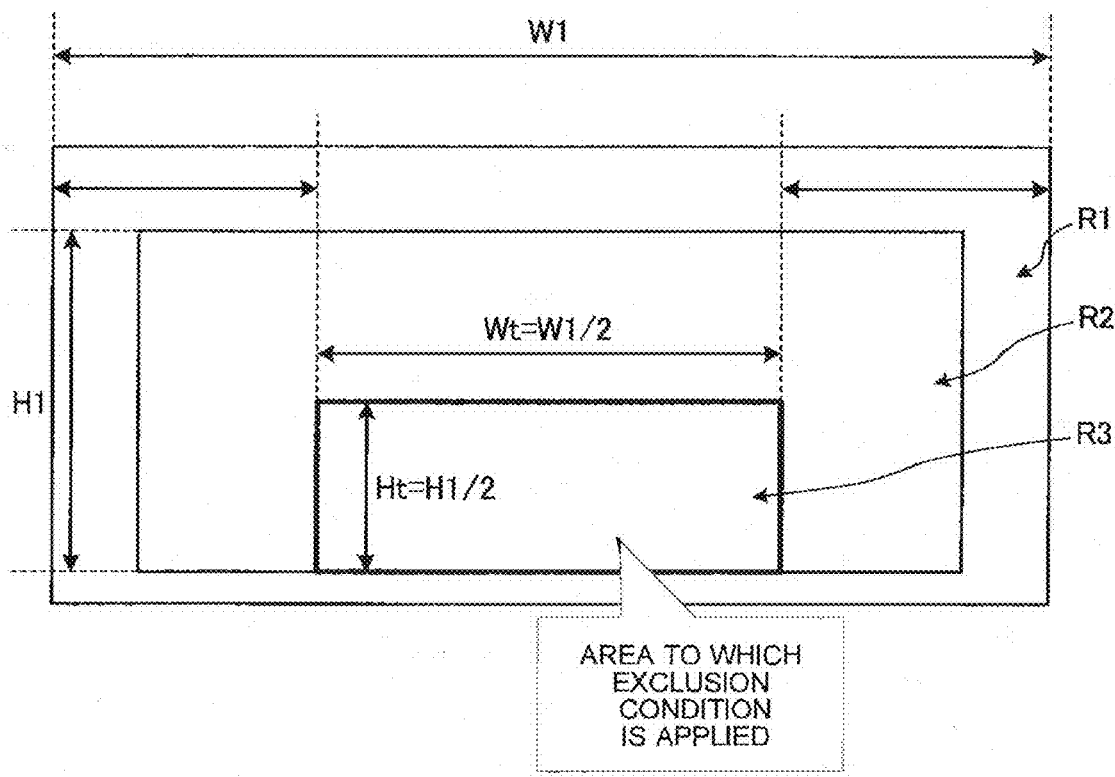
FIG. 8E is an illustrative diagram (No. 5) of the exclusion process of the candidate area executed by the detector.
FIG. 8F is an illustrative diagram (No. 6) of the exclusion process of the candidate area executed by the detector.

In consideration of these examples, in this embodiment, as illustrated in FIG. 8E, the exclusion condition that is the "road surface reflection corresponding condition" is a condition #1, a condition #2, or a condition #3. The condition #1 is "a matching frequency for any one of four sides >10". This condition corresponds to the examples of FIG. 8A and FIG. 8W The condition #2 is "(a matching frequency for two sides=0) AND (a total matching frequency for remaining two sides >10)". This condition corresponds to the example of FIG. 8C. The condition #3 is "a total matching frequency for four sides ≥25". This condition corresponds to the example of FIG. 8D.

The detector 12e determines whether or not each of the candidate areas Da stored in the detection information 11b corresponds to such an exclusion condition. When the candidate area Da corresponds to the exclusion condition, the detector 12e determines that it is erroneous detection. When the candidate area Da does not correspond to the exclusion condition, the detector 12e determines that it is correct detection.

An applicable range of the exclusion condition may be limited. For example, as illustrated in FIG. 8F, if an area R1 having a width W1 and a height H1 is a whole screen size, the exclusion condition may be applied to only an area R3 having a width Wt (=W1/2) and a height Ht (=H1/2) in a center lower part of the area R1. An area R2 is, for example, an effective range of attachable matter detection.

That is, the exclusion condition may be applied only to a vicinity of the host vehicle, considered to be significantly influenced by erroneous detection, in which a road surface reflection easily occurs. As a result, it is possible to reduce a processing load.

Figure 9:
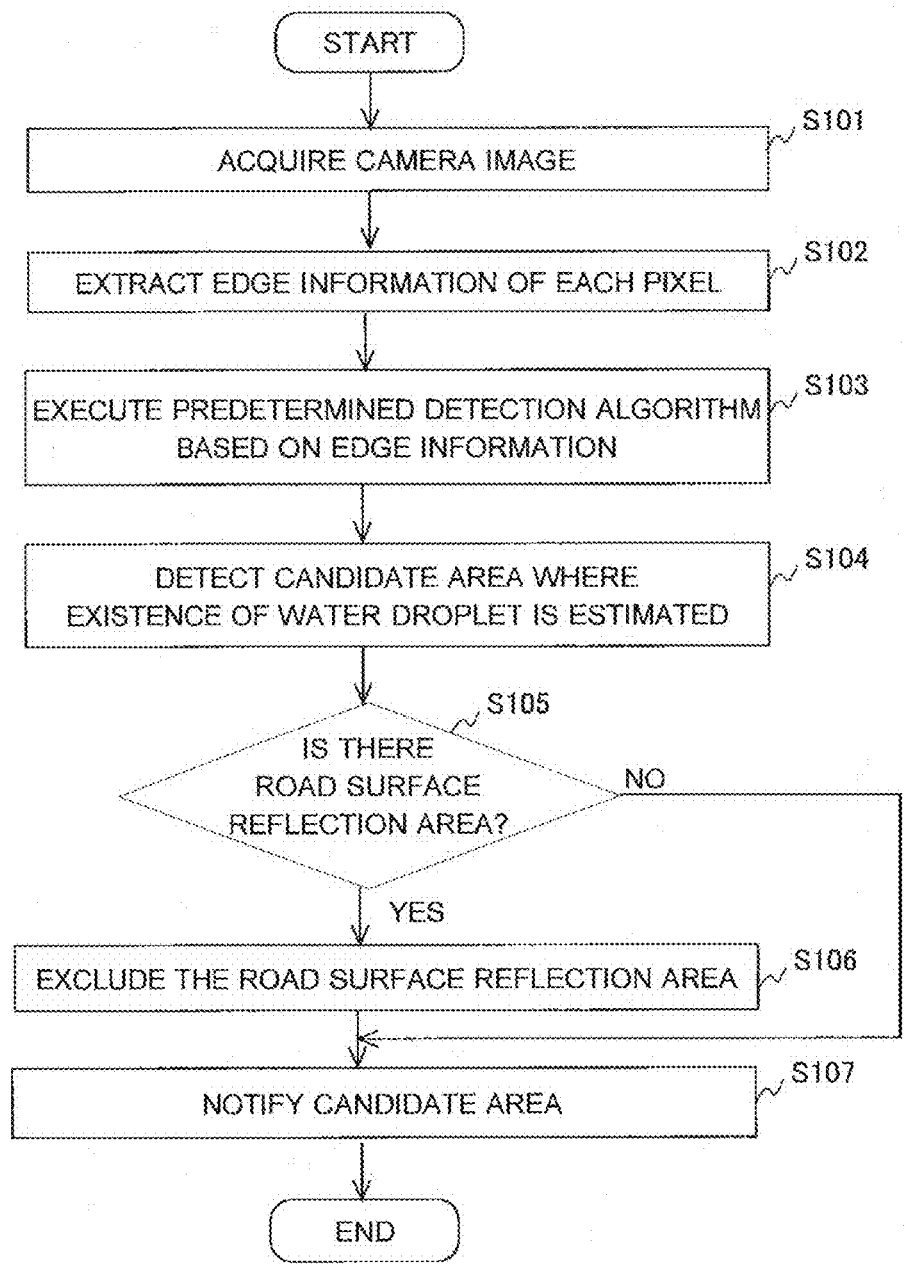
FIG. 9 is a flowchart illustrating a processing procedure executed by the attachable matter detection apparatus according to the embodiment.

Next, a processing procedure executed by the attachable matter detection apparatus 10 according to the embodiment will be described with reference to FIG. 9. FIG. 9 is a flowchart illustrating the processing procedure executed by the attachable matter detection apparatus 10 according to the embodiment. FIG. 9 illustrates a processing procedure for a camera image of a single frame.

First, the acquisition part 12a acquires a camera image (a step S101). The extractor 12b extracts edge information of each pixel (a step S102).

Subsequently, the converter 12c, the matching part 12d, and the detector 12e execute a predetermined detection algorithm based on the edge information extracted by the extractor 12b (a step S103). The detector 12e extracts a candidate area Da where existence of a water droplet is estimated based on an execution result of the algorithm (a step S104).

That is, the converter 12c and the matching part 12d execute each process illustrated in FIG. 3 to FIG. 5B by way of example, and the detector 12e detects the candidate area Da by the detection process illustrated in FIG. 6.

A detection algorithm to detect the candidate area Da is not limited to the aforementioned example. For example, the converter 12c may calculate edge strength of each pixel based on the edge information extracted by the extractor 12b and binarize each pixel by comparing the edge strength with a binarization threshold value having different values depending on a surrounding environment of the camera 2.

The converter 12c may calculate edge directions of each pixel based on the edge information extracted by the extractor 12b and convert each pixel using a parameter by which the opposite edge directions have a 1's complement relationship after the conversion.

In this case, the matching part 12d may perform a matching process between each pixel converted into a data format by the convertor 12c and a template representing a water droplet and having the data format.

After the step S104, the detector 12e determines whether or not there is a road surface reflection area among the detected candidate areas Da based on the detection information 11b and the exclusion information 11c (a step S105).

Here, when there is a road surface reflection area (Yes in the step S105), the detector 12e excludes the road surface reflection area (a step S106). When there is no road reflection area (No in the step S105), the control moves to a step S107.

Then, in the step S107, the detector 12e notifies various devices 20 of the candidate area Da and ends the process.

As described above, the attachable matter detection apparatus 10 according to the embodiment includes the extractor 12b and detector 12e. The extractor 12b extracts the edge information of each pixel contained in the photographic image I photographed by the camera 2 (corresponding to an example of "imaging device"). The detector 12e detects the candidate area Da estimated to have a water droplet out of the photographic image I based on a matching result between each pixel converted into a predetermined data format based on the edge information extracted by the extractor 12b and the template representing a water droplet and having the data format. The detector 12e calculates a matching frequency with the template for a contour area Ra (corresponding to an example of "predetermined area along a contour") along a contour of the candidate area Da, and excludes the candidate area Da that satisfies a predetermined exclusion condition based on the matching frequency from candidate areas Da.

Therefore, according to the attachable matter detection apparatus 10 according to the embodiment, for example, it is possible to prevent a road surface reflection from being erroneously detected as a water droplet and it is possible to improve detection accuracy.

The detector 12e excludes the candidate area Da when the matching frequency for any one of four sides of the candidate area Da is larger than a predetermined threshold value.

Therefore, according to the attachable matter detection apparatus 10 according to the embodiment, it is possible to prevent a road surface reflection whose upper side or lower side tends to appear blurred and spread from being erroneously detected as a water droplet.

The detector 12e excludes the candidate area Da when the matching frequency for specific sides of four sides of the candidate area Da is equal to or smaller than a predetermined threshold value, and a total matching frequency for remaining sides other than the specific sides is larger than the predetermined threshold value.

Therefore, according to the attachable matter detection apparatus 10 according to the embodiment, it is possible to prevent a road surface reflection including a pattern on a road surface, such as a white line, from being erroneously detected as a water droplet.

The detector 12e excludes the candidate area Da when a total matching frequency for four sides of the candidate area Da is larger than a predetermined threshold value.

Therefore, according to the attachable matter detection apparats 10 according to the embodiment, it is possible to prevent a rounded road surface reflection from being erroneously detected as a water droplet.

The detector 12e applies the exclusion condition only to the predetermined area R3 in the photographic image I.

Therefore, according to the attachable matter detection apparatus 10 according to the embodiment, for example, by applying the exclusion condition only to the vicinity of the host vehicle in which a road surface reflection easily occurs, it is possible to reduce a processing load.

In the aforementioned embodiment, the exclusion condition is applied to only the area R3 corresponding to the vicinity of the host vehicle, but the invention is not limited thereto. The exclusion condition may be applied to an arbitrary area. For example, the exclusion condition may be applied to an arbitrary area significantly influenced by erroneous detection due to a road surface reflection depending on each installation position of the front camera 2-1, the rear camera 2-2, and the right side camera 2-3 and the left side camera 2-4.

In the aforementioned embodiment, a case where the contour area Ra is set inside the contour of the candidate area Da has been described as an example (refer to FIG. 7C). However, the contour area Ra may be set outside the contour of the candidate area Da as long as the contour area Ra is along the contour of the candidate area Da.

In the aforementioned embodiment, an example in which the exclusion condition is used for the candidate area Da desired to exclude has been described. However, the exclusion condition may he used for the candidate area Da desired to detect. That is, the candidate area Da corresponding to a road surface reflection may be used as the candidate area Da desired to detect.

It is possible for a person skilled in the art to easily come up with more effects and modifications. Thus, a broader modification of this invention is not limited to specific description and typical embodiments described and expressed above. Therefore, various modifications are possible without departing from the general spirit and scope of the invention defined by claims attached and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. An attachable matter detection apparatus comprising a controller configured to function as:
    an extractor that extracts edge information of each pixel contained in a photographic image photographed by an imaging device; and
    a detector that detects a candidate area estimated to have a water droplet out of the photographic image based on a matching result between (i) each of the pixels converted into a predetermined data format based on the edge information extracted by the extractor and (ii) a template representing a water droplet and having the data format, wherein
    the detector calculates a matching frequency with the template for a predetermined area along a contour of the candidate area, arid excludes the candidate area when the candidate area satisfies a predetermined exclusion condition based on the matching frequency.

2. The attachable matter detection apparatus according to claim 1, wherein
    the detector excludes the candidate area when a matching frequency for any one of four sides of the candidate area is larger than a predetermined threshold value.

3. The attachable matter detection apparatus according to claim 1, wherein
    the detector excludes the candidate area when a matching frequency for specific sides of four sides of the candidate area is equal to or smaller than a predetermined threshold value, and a total matching frequency for remaining sides other than the specific sides is larger than the predetermined threshold value.

4. The attachable matter detection apparatus according to claim 1, wherein
    the detector excludes the candidate area when a total matching frequency for four sides of the candidate area is larger than a predetermined threshold value.

5. The attachable matter detection apparatus according to claim 1, wherein
    the detector applies the predetermined exclusion condition only to a predetermined area in the photographic image.

6. An attachable matter detection method comprising the steps of:
    (a) extracting, by a controller, edge information, of each pixel contained in a photographic image photographed by an imaging device; and
    (b) detecting, by the controller, a candidate area estimated to have a water droplet out of the photographic image based on a matching result between (i) each of the pixels converted into a predetermined data format based on the edge information extracted in the step (a) and (ii) a template representing a water droplet and having the data format, wherein
    the step (b) calculates a matching frequency with the template for a predetermined area along a contour of the candidate area, and excludes the candidate area when the candidate area satisfies a predetermined exclusion condition based on the matching frequency.

7. The attachable matter detection method according to claim 6, wherein
    the step (b) excludes the candidate area when a matching frequency for any one of four sides of the candidate area is larger than a predetermined threshold value.

8. The attachable matter detection method according to claim 6, wherein
    the step (b) excludes the candidate area when a matching frequency for specific sides of four sides of the candidate area is equal to or smaller than a predetermined threshold value, and a total matching frequency for remaining sides other than the specific sides is larger than the predetermined threshold value.

9. The attachable matter detection method according to claim 6, wherein
    the step (b) excludes the candidate area when a total matching frequency for four sides of the candidate area is larger than a predetermined threshold value.

10. The attachable matter detection method according to claim 6, wherein
    the step (b) applies the predetermined exclusion condition only to a predetermined area in the photographic image.

* * * * *